US005454154A

United States Patent [19]

Cherian et al.

[11] Patent Number: 5,454,154

[45] Date of Patent: Oct. 3, 1995

[54] PHOTORECEPTOR STRIPPING METHODS

[75] Inventors: Abraham Cherian, Webster; William G. Herbert, Williamson, both of N.Y.

[73] Assignee: Xerox Corporation, Stamford, Conn.

[21] Appl. No.: 353,888

[22] Filed: Apr. 7, 1993

[51] Int. Cl.$^6$ .................................................... B23P 17/00

[52] U.S. Cl. ...................... 29/426.4; 29/426.5; 29/419.2; 156/344; 156/584

[58] Field of Search ............................ 29/81.02, 81.021, 29/426.4, 426.5, 419.2, 762; 156/344, 584; 72/56

[56] References Cited

U.S. PATENT DOCUMENTS

| | | | |
|---|---|---|---|
| 2,976,907 | 3/1961 | Hawey et al. | 153/10 |
| 3,175,383 | 3/1965 | Levine | 72/56 |
| 3,383,890 | 5/1968 | Wildi | 72/56 |
| 3,938,266 | 2/1976 | Cook | 156/584 X |
| 4,043,019 | 8/1977 | Schröder | 29/426.4 X |
| 4,265,990 | 5/1981 | Stolka et al. | 430/59 |
| 4,962,656 | 10/1990 | Kunerth et al. | 29/419.2 X |
| 5,043,035 | 8/1991 | Yoshikawa | 156/344 X |

OTHER PUBLICATIONS

Chen, Y. T., et al., "Removing Metallic Films From Substrates", IBM Technical Disclosure Bulletin, vol. 16, No. 8, Jan. 1974.

"Contoured Tubing Transitions Made With Magneform®", Maxwell Laboratories, Product Bulletin MLB–2013A.

"Advantages of Magneform® Over Conventional Assembly Methods", Maxwell Laboratories, Product Bulletin MLB–2003A.

Magneform®–Metal Forming With Magnetic Force, Maxwell Laboratories, Product Bulletin MLB–2044A.

Maxwell Laboratories Magneform 7000 Series Bulletin 1202A.

Maxwell Laboratories Bulletin 1201R (1976).

Rubber Boot Banded onto Automotive Ball–Joint by Magneform® Method, Maxwell Laboratories Product Bulletin MLB–2008A.

*Primary Examiner*—S. Thomas Hughes
*Attorney, Agent, or Firm*—Zosan S. Soong

[57] ABSTRACT

A method is disclosed for the removal of layered material from a photoreceptor comprising an electrically conductive substrate, wherein the method comprises: employing a magnetic field to expand or shrink the width of at least a portion of the substrate, whereby a portion of the layered material over the expanded or shrunken portion of the substrate becomes loosened from the photoreceptor.

17 Claims, 1 Drawing Sheet

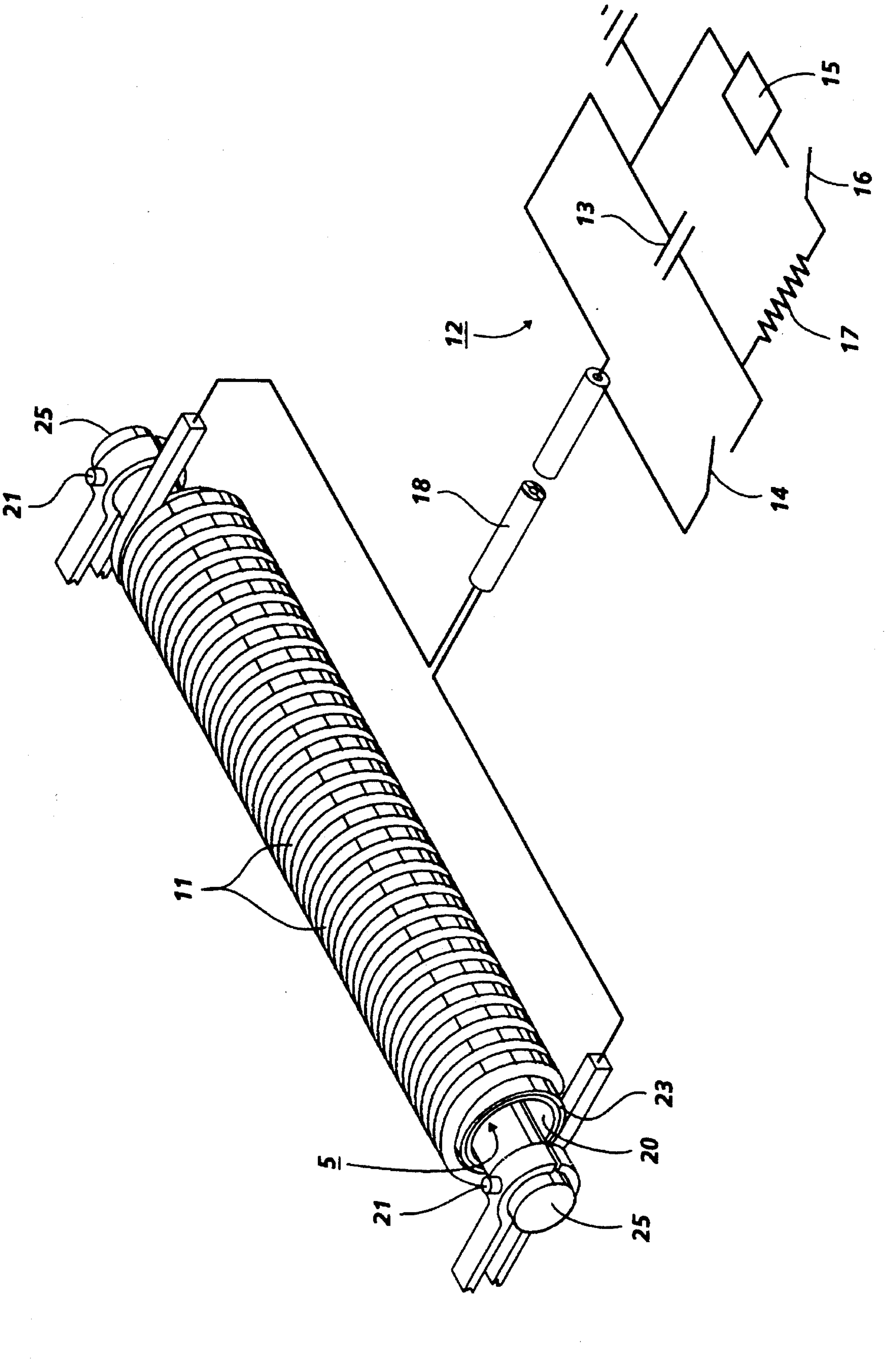
25
21
11
5
21
25
23
20
18
12
13
14
15
16
17

PHOTORECEPTOR STRIPPING METHODS

BACKGROUND OF THE INVENTION

This invention relates generally to the removal of coatings from an imaging member such as a photoreceptor, and more particularly to a method for stripping layered materials from a photoreceptor using the technique of magnaforming, which refers to the generation of a magnetic field to shape an article.

Magnaforming is illustrated for example in Harvey et al., U.S. Pat. No. 2,976,907, the disclosure of which is totally incorporated by reference. This patent discloses methods to expand or to decrease the size of metal tubes using a magnetic field. Magnaforming requires an apparatus for setting up a predetermined varying magnetic field. When a conductive member ("conductor") is placed in a varying magnetic field, a current is induced in the conductor. The interaction between this current and the magnetic field will then subject the conductor to a force. If the conductor is constrained and if a sufficient amount of energy is acquired by the conductor, the conductor will be deformed. The work performed on, or the energy acquired by the conductor depends upon the position of the conductor relative to the magnetic field, the strength of the magnetic field, the current induced in the conductor, the mass of the conductor, internal forces within the conductor, and the frequency of variations in the magnetic field. Accordingly, a high instantaneous pressure may be applied to the conductor by utilizing a current pulse to set up the magnetic field.

Presently, photoreceptors, especially layered photoreceptors of the type illustrated in Stolka et al., U.S. Pat. No. 4,265,990, the disclosure of which is totally incorporated by reference, are salvaged for reuse by, for example, heat stripping, lathing, and solvent stripping to remove the photosensitive layer(s), blocking layer, adhesive layer, and any other layers typically employed in a photoreceptor from the substrate. These removal processes are labor intensive, require an inordinate amount of manufacturing space, require physical contact with the photoreceptor which may damage it, and contribute to pollution of the environment.

There is a need for a method that facilitates removal of the layered material from a substrate which reduces the need for physical contact with the photoreceptor, which reduces pollution, which reduces the area dedicated to photoreceptor salvage, and which is faster and relatively less costly to implement than conventional removal methods.

SUMMARY OF THE INVENTION

It is an object of the present invention to facilitate removal of layered material from a photoreceptor by employing magnaforming to expand or shrink the cross-sectional dimension of the substrate.

It is another object to provide a layered material removal method which accomplishes one or more of the following: reduces the need for physical contact with the photoreceptor, minimize pollution, reduces the area dedicated to photoreceptor salvage, and which is quicker and relatively less costly to implement than conventional methods.

A further object is to provide processes for the economical removal of laminate type or single layer type photoconductive layers from layered imaging members.

These objects and others are met in embodiments by providing a method for the removal of layered material from a photoreceptor comprising an electrically conductive substrate, wherein the method comprises: employing a magnetic field to expand or shrink the width of at least a portion of the substrate, whereby a portion of the layered material over the expanded or shrunken portion of the substrate becomes loosened from the photoreceptor.

BRIEF DESCRIPTION OF THE DRAWINGS

Other aspects of the present invention will become apparent as the following description proceeds and upon reference to the Figure which shows a schematic perspective view of one embodiment of the present invention.

DETAILED DESCRIPTION

Referring to the Figure, which pertains to a method and apparatus for shrinking the diameter of a substrate to effect loosening of layered material, photoreceptor 5 comprises substrate 20 and layered material 23. Photoreceptor 5 is positioned entirely inside magnetic coil or solenoid 11. Rod 25, gripped by clamps 21, is positioned within photoreceptor 5 to provide support thereto. When a current pulse is applied to magnetic coil 11 a varying magnetic field is set up which induces an electromotive force in substrate 20 which, in turn, causes a high-current to flow around substrate 20. If the energy transferred to photoreceptor 5 by the interaction of the induced current and the magnetic field is sufficient, the tubular wall of substrate 20 will be forced inwardly, thereby shrinking the cross-sectional size of substrate 20. A portion, preferably all, of layered material 23 loosens from substrate 20 in response to the energy transferred to photoreceptor 5. The varying magnetic field is set up by passing a current pulse through a magnetic coil 11. While pulses can be provided in any desired manner, in the illustrated embodiment, one or more pulses (preferably one pulse) are supplied by means of pulsing network 12 which includes high capacity condenser 13 in series with switch 14, such as an ignitron, thyratron, spark gap, and the like. The condenser 13 may be charged by means of a suitable high-voltage supply 15 which is connected to the condenser through a switch means 16 and a current limiting resistor 17. Cable 18, such as a coaxial cable, connects pulsing network 12 to coil 11.

In an alternative embodiment pertaining to a method and apparatus for increasing the diameter of a substrate to effect loosening of layered material, a magnetic generating device such as a magnetic coil is positioned inside the photoreceptor along a portion of the length thereof, and preferably along the entire length. The magnetic coil produces an extremely intense pulsed magnetic field which induces current in the substrate, thereby creating an opposing magnetic field. The net magnetic force generates a uniform pressure which is applied to the inner surface of the substrate to expand the substrate. The magnetic coil may be of any effective design. The structure and operation of the magnetic coil and associated equipment to generate the magnetic field may be similar to that disclosed in U.S. Pat. No. 2,976,907 and Cherian et al., U.S. Ser. No. 07/990,852, filed Dec. 14, 1992 (Attorney Docket No. D/92041), the disclosures of which are totally incorporated by reference. A magnetic coil suitable for expanding the substrate may be purchased for example from Maxwell Laboratories, Inc. Although a die may surround the substrate during expansion of the substrate as illustrated in U.S. Pat. No. 2,976,907 and Cherian et al., U.S. Ser. No. 07/990,852, the die is preferably absent since expansion of the substrate against the die's inner wall may interfere with the loosening of the layered material.

During magnaforming, the layered material loosens from the photoreceptor in a few microseconds, typically from about 1 to about 50 microseconds, after the magnetic field generated energy is transferred to the photoreceptor. The layered material, over the shrunken or expanded portion of the substrate, becomes loosened from the photoreceptor as the layered material fractures since it generally cannot shrink or stretch as quickly as the substrate material which may be for example aluminum or nickel. Loosening is achieved when the the stresses associated with the attempted shrinking or stretching of the layered material exceed the bonding strength of the layered material to the substrate or of one layer to another layer. The term "loosened" refers to the complete or partial disintegration of the layered material and partial or full separation of photoreceptor layers from one another or from the substrate and includes the phenomena of fracturing, flaking off, and peeling. Layered material which still adheres to the photoreceptor may be considered "loosened" if it exhibits signs of cracking, peeling, and the like. The nature of how the layered material becomes loosened depends at least partly upon its composition. For example, a photoconductive layer comprised of an amorphous selenium or selenium alloy typically may crack and flake off. In contrast, an organic photoconductive layer, which is usually more flexible than amorphous selenium or selenium alloy, may peel off in larger portions or even as a relatively intact layer. In embodiments, about 40% to 100% by weight, preferably, about 70% to about 90% by weight, of the layered material as determined by visual estimation becomes loosened from the photoreceptor. In embodiments, the quantity of loosened material can be determined by weighing the loosened material which has fallen off and/or has been manually removed and comparing the amount with the total weight of the layered material. The layered material may comprise only one layer, but it typically comprises a plurality of layers such as one or more of the following: one or more photoconductive layers, adhesive layer, charge blocking layer, anti-curling layer, overcoating layer and the like.

One or more of the layers described herein or portions thereof may remain on the substrate surface even after repeated magnaforming using increasingly stronger magnetic fields. The remaining layered material may be removed by any appropriate method including one or more of the following: manually peeling or breaking off portions of the layered material, chemical removal employing solvents such as water and organic solvents (e.g., acetone, methylethyl ketone), heat stripping, buffing, and lathing. In embodiments, the adhesive for the organic photoconductive layer may be water soluble and thus any remaining layered material may be removed by using water. It is preferred not to use solvents with selenium and selenium alloy photoconductive materials since the required solvents may be difficult to work with. Thus, removal of any remaining selenium and selenium alloy photoconductive materials may require a more aggressive clean up involving for example lathing or buffing any residue from the substrate surface. In preferred embodiments, there is no layered material remaining on the substrate after magnaforming or a minimal amount remains such as from about 0.001% to about 0.01% by weight which would require removal by the methods described herein.

The amount of energy transferred to a photoreceptor for a given solenoid can be increased by increasing the voltage applied to the condenser, increasing the capacity of the condenser, or increasing the number of pulses applied to the photoreceptor. An effective amount of energy is transferred to the photoreceptor, preferably about 0.5 to about 50 kilojoules ("kJ"), more preferably about 3 to about 20 kJ, and particularly about 4.5 kJ. During magnaforming, effective pressures are produced by the magnetic field and applied to the photoreceptor, preferably up to about 50,000 pounds per square inch ("psi"), more preferably about 5,000 to about 20,000 psi, and especially about 10,000 psi.

In the present invention, the cross-sectional dimension or width of the substrate may be decreased or increased by any amount effective to loosen layered material. Preferably, the cross-sectional diameter of the substrate may be shrunk or expanded by about 0.1 to about 40%, more preferably about 1 to about 20%, and especially about 0.1 to about 5%. Changes in the width of the substrate may be measured by a micrometer.

The magnetic coil to shrink the substrate width may be of any effective design and dimensions. Preferably, the coil is of sufficient length to encompass the entire length of the photoreceptor. In embodiments, only a portion of the photoreceptor is positioned inside the coil and a "step shrinking" method is used where only a portion of the photoreceptor undergoes magnaforming at a time. After a segment of the photoreceptor is magnaformed, the photoreceptor or the coil is moved to position another segment for magnaforming, and this is repeated until the entire photoreceptor undergoes magnaforming. The coil is fabricated from a suitable conductive metal such as copper. The coil preferably has about 3 to about 30 turns, and more preferably about 5 to about 15 turns. The solenoid has the following preferred dimensions: a cross-sectional area of about 0.5 to about 4 square centimeters, and more preferably from about 0.7 to about 2 square centimeters; internal diameter of about 1 to about 10 centimeters, and more preferably about 2 to about 5 centimeters; an outside diameter of about 2 to about 12 centimeters, and more preferably about 4 to about 8 centimeters; and a length of about 4 to about 25 centimeters, and more preferably about 6 to about 14 centimeters. Magnaforming machines incorporating a magnetic coil, energy storage capacitors, and switching devices and components thereof are available for example from Maxwell Laboratories, Inc.

The photoreceptor is supported by any suitable means. In a preferred embodiment, as seen in the Figure, a rod is used to support the photoreceptor. The rod may be of any suitable design, size and composition. The rod is preferably cylindrical and may be hollow or solid. The rod is preferably fabricated from a nonconductive material such as a suitable plastic including a polycarbonate. The rod has a smaller diameter than the photoreceptor, and is preferably smaller than the photoreceptor by at least 0.25 inch, and more preferably about 0.25 to about 2 inches after magnaforming. It is understood that in embodiments the substrate may shrink sufficiently to press against the rod, in which case, the rod limits the shrinkage. The rod may be two separate pieces, each gripped by a clamp, instead of a continuous member so that the pieces support the ends of the photoreceptor. In embodiments, the rod is not used to support the photoreceptor; instead, one or both ends of the photoreceptor extend beyond the magnetic coil. Each protruding photoreceptor end is supported by a clamp. A "step shrinking" method as described herein is then employed to magnaform the entire photoreceptor. Another way to support the photoreceptor without the use of a rod is to position the photoreceptor vertically on a flat surface; the magnetic coil would then also be disposed vertically to envelop a portion of or the entire photoreceptor. In embodiments, the entire photoreceptor need not undergo magnaforming if shrinking only a portion of the substrate strips off an effective amount of the layered material from the photoreceptor.

After the layered material is completely removed from the substrate, the substrate is relatively unscathed and it can be reused to form new imaging members. For example, where the substrate has been shrunken, the substrate may be sized by magnaforming to expand the substrate against a die as illustrated in Harvey et al., U.S. Pat. No. 2,976,907 and U.S. Ser. No. 07/990,852 (Attorney Docket No. D/92041). Where the substrate has been expanded to loosen layered material, the expanded substrate may be sized by machining to reduce the dimensions thereof and/or by compressive magnaforming in a manner similar to that disclosed herein and in U.S. Pat. No. 2,976,907. For compressive magnaforming, an inner die may optionally be employed to provide the desired finish to the inner surface of the substrate.

The substrate can be formulated entirely of an electrically conductive material, or it can be an insulating material having an electrically conductive surface. The substrate can be opaque or substantially transparent and can comprise numerous suitable materials having the desired mechanical properties. Any suitable electrically conductive material can be employed. Typical electrically conductive materials include metals like copper, brass, nickel, zinc, chromium, stainless steel; conductive plastics and rubbers, aluminum, semitransparent aluminum, steel, cadmium, titanium, silver, gold, paper rendered conductive by the inclusion of a suitable material like carbon black therein or through conditioning in a humid atmosphere having a relative humidity for example of greater than 50%, preferably about 50 to about 80%, to ensure the presence of sufficient water content to render the material conductive, indium, tin, metal oxides, including tin oxide and indium tin oxide, and the like. The substrate can be of any other conventional material, including organic and inorganic materials. Typical substrate materials include insulating non-conducting materials such as various resins known for this purpose including polycarbonates, polyamides, polyurethanes, paper, glass, plastic, polyesters such as MYLAR® (available from DuPont) or MELINEX 447® (available from ICI Americas, Inc.), and the like. If desired, a conductive substrate can be coated by for example bar coating onto an insulating material. In addition, the substrate can comprise a metallized plastic, such as titanized or aluminized MYLAR®, wherein the metallized surface is in contact with the photosensitive layer or any other layer situated between the substrate and the photosensitive layer. The coated or uncoated substrate can be flexible or rigid, and can have any number of configurations, such as a plate, a cylindrical drum, a scroll, an endless flexible belt, or the like.

The substrate layer can vary in thickness over substantially wide ranges depending on the desired use of the electrophotoconductive member, preferably from about 0.001 inch to about 10 centimeters, and more preferably from about 0.001 inch to about 1 centimeter. Where the substrate comprises a conductive coating on an insulating material, the conductive coating may be of any appropriate thickness, preferably from about 0.0000010 to about 0.10 inch, and more preferably from about 0.000020 to about 0.000050 inch; and the insulating material may be of any appropriate thickness, preferably from about 0.0010 to about 0.10 inch, and more preferably from about 0.004 to about 0.050 inch.

The substrate may be of any dimension conventionally employed in photoreceptors. For example, in embodiments, hollow cylindrical substrates may have an inside diameter ranging from about 0.1969 inch (5 mm) to about 30 inches, an outside diameter ranging from about 0.1971 inch to about 30.5 inches, a length ranging from about 7 to about 44 inches, and a wall thickness ranging from about 0.001 to about 4 inches.

Present on the substrate are one or more of the following layers: a charge blocking layer, an adhesive layer, photoconductive layer(s) and an anti-curl layer, and any other layer typically employed in a photoreceptor. Compositions of each of the layers described herein are illustrated for example in Yu, U.S. Pat. No. 5,167,987, the disclosure of which is totally incorporated by reference. The photoconductive layer may be of the laminate type having separate charge generating and charge transporting layers or of the single-layer type. Preferred charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments; indigo pigments such as indigo, thioindigo, and the like; bisbenzoimidazole pigments such as Indofast Orange toner, and the like; phthalocyanine pigments such as copper phthalocyanine, aluminochloro-phthalocyanine, titanyl phthalocyanine, vanadyl phthalocyanine, and the like; quinacridone pigments; and azulene compounds. Preferred charge transport materials include compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and the like, aryl amines, and hydrazone compounds. Illustrative photoconductive layers are found in for example Stolka et al., U.S. Pat. No. 4,265,990, the disclosure of which is totally incorporated by reference, which discloses a charge transport layer comprising a polycarbonate resin and an aryl amine. Other typical photoconductive layers include amorphous or alloys of selenium such as selenium-arsenic, selenium-tellurium-arsenic, selenium-tellurium, and the like. The photoconductive layer(s) may be of any suitable thickness. A single layer type photoconductive layer may have a thickness preferably of about 0.1 to about 100 microns. In preferred embodiments, the charge generating and charge transport layers of a laminate type each may have a thickness of about 0.05 microns to about 50 microns.

Some materials can form a layer which functions as both an adhesive layer and charge blocking layer. Typical blocking layers include polyvinylbutyral, organosilanes, epoxy resins, polyesters, polyamides, polyurethanes, silicones, and the like. The polyvinylbutyral, epoxy resins, polyesters, polyamides, and polyurethanes can also serve as an adhesive layer. Adhesive layers, charge blocking layers, anti-curl layers and any other layers conventionally employed in photoreceptors may have an effective thickness, and preferably from about 0.1 to about 20 microns.

The invention will now be described in detail with respect to specific preferred embodiments thereof, it being understood that these examples are intended to be illustrative only and the invention is not intended to be limited to the materials, conditions or process parameters recited herein.

EXAMPLE 1

A used cylindrical photoreceptor comprising an aluminum substrate to be salvaged is vertically positioned on a flat surface. The photoreceptor has the following dimensions and composition: 80 mm in diameter; 340 mm long; 1 mm thick substrate wall; and layered material comprising from the layer closest to the substrate to the top layer, 0.5 microns thick of an undercoat layer of zirconiumsilane, 1 micron thick of a charge generating layer comprising dibromoanthrone and polyvinylbutyral, and 20 microns thick of a charge transport layer comprising polycarbonate. A vertically disposed magnetic coil envelops a portion of the photoreceptor. The coil is coupled through a co-axial cable to an electrical generating device. The coil, cable, and electrical generating device are available from Maxwell Laboratories Inc. The electrical generating device charges and discharges a capacitor to supply about 4 kJ of energy to the photoreceptor. Within about 20 microseconds, the resulting magnetic field reduces the diameter of the substrate portion inside the coil by about 0.6%, thereby causing the layered material over the shrunken substrate portion to crack except the layer of zirconiumsilane. The layered material cracks to form a spider web like network of fissures. The coil is then repositioned over the next segment of the photoreceptor and the magnaforming process is performed. This "step shrinking" process is repeated until the entire photoreceptor undergoes magnaforming which shrinks the substrate and causes the remaining layered material to crack, thereby forming a spider web like network of fissures. About 40% by weight of the layered material spontaneously flakes off the photoreceptor surface, as determined by visual approximation. The layered material, particularly the photoconductive layers, is readily removed by manually breaking off or peeling off the loosened material from the substrate surface. The remaining UCL-Zr (about 70% by weight of the original UCL-Zr) is removed by rinsing the substrate in room temperature tap water, i.e., a temperature of about 60–80° F.

EXAMPLE 2

A used cylindrical photoreceptor comprising an aluminum substrate to be salvaged is vertically positioned on a flat surface. The photoreceptor has the following dimensions and composition: 80 mm in diameter, 340 mm long, 3 mm thick substrate wall, and 60 microns thick photoconductive layer comprising amorphous selenium. A vertically disposed magnetic coil envelops a portion of the photoreceptor. The coil is coupled through a co-axial cable to an electrical generating device. The coil, cable, and electrical generating device are available from Maxwell Laboratories Inc. The electrical generating device charges and discharges a capacitor to supply 6.5 kJ of energy to the photoreceptor. Within about 20 microseconds, the resulting magnetic field reduces the diameter of the substrate portion inside the coil by about 0.7%, thereby causing the layered material over the shrunken substrate portion to crack and fall away from the substrate. Subsequent microprobe analysis indicates that all of the amorphous selenium has been removed. The coil is then repositioned over the next segment of the photoreceptor and the magnaforming process is performed. This "step shrinking" process is repeated until the entire photoreceptor undergoes magnaforming which shrinks the substrate and causes the remaining layered material to crack and fall away from the substrate. About 99.999% by weight of the layered material spontaneously flakes off the photoreceptor surface, as determined by microprobe analysis.

Other modifications of the present invention may occur to those skilled in the art based upon a reading of the present disclosure and these modifications are intended to be included within the scope of the present invention.

I claim:

1. A method for the removal of layered material from a photoreceptor comprising an electrically conductive substrate, wherein the method comprises shrinking the cross-sectional size of at least a portion of the substrate by applying a magnetic field generated force to the substrate, thereby loosening a portion of the layered material over the shrunken portion of the substrate.

2. The method of claim 1, wherein the substrate has a cylindrical shape.

3. The method of claim 1, wherein the substrate is fabricated entirely of a conductive metal.

4. The method of claim 1, wherein the substrate is fabricated from copper, aluminum, low-carbon steel, or brass.

5. The method of claim 1, wherein the layered material comprises a plurality of layers.

6. The method of claim 1, wherein the cross-sectional size along the entire length of the substrate is shrunk.

7. The method of claim 1, wherein the magnetic field generated force is generated by a magnetic field generating device which surrounds at least a portion of the length of the photoreceptor.

8. The method of claim 1, wherein there is transferred to the photoreceptor by the magnetic field generated force energy ranging from about 0.5 to about 50 kJ.

9. The method of claim 1, wherein there is transferred to the photoreceptor by the magnetic field generated force energy ranging from about 3 to about 20 kJ.

10. The method of claim 1, wherein the layered material comprises a single layer photoconductive layer or a laminate photoconductive layer including a charge transport layer and a charge generating layer.

11. The method of claim 1, wherein the entire layered material is loosened from the photoreceptor.

12. The method of claim 1, further comprising removing layered material from the photoreceptor.

13. The method of claim 1, wherein the cross-sectional size of at least a portion of the substrate is shrunk by about 0.1% to about 40%.

14. The method of claim 1, wherein the cross-sectional size of at least a portion of the substrate is shrunk by about 1% to about 20%.

15. The method of claim 1, wherein about 40 to 100% by weight of the layered material becomes loosened from the photoreceptor.

16. The method of claim 1, wherein the layered material comprises one or more of a laminate or single layer photoconductive layer, an adhesive layer, a charge blocking layer, an anti-curling layer, and an overcoating layer, wherein at least a portion of the layered material falls away from the photoreceptor during or after shrinking of the substrate and optionally further comprising removing the remaining layered material from the substrate.

17. A method for the removal of layered material from a photoreceptor comprising an electrically conductive substrate, wherein the method comprises shrinking the cross-sectional size along the entire length of the substrate by applying a magnetic field generated force to the substrate, resulting in a first layered material portion which falls away from the photoreceptor and a second layered material portion which remains on the photoreceptor, and further comprising removing the second layered material portion, thereby resulting in the removal of the entire layered material from the substrate.

* * * * *